(12) United States Patent
Higbie et al.

(10) Patent No.: US 8,764,276 B1
(45) Date of Patent: Jul. 1, 2014

(54) CAULKING MATERIAL COLORING SYSTEM

(76) Inventors: Christine Higbie, Canyon Lake, TX (US); Theodore Scott Higbie, Canyon Lake, TX (US)

(*) Notice: Subject to any disclaimer, the term of this patent is extended or adjusted under 35 U.S.C. 154(b) by 907 days.

(21) Appl. No.: 12/855,414

(22) Filed: Aug. 12, 2010

Related U.S. Application Data

(60) Provisional application No. 61/233,731, filed on Aug. 13, 2009.

(51) Int. Cl.
*B01F 3/10* (2006.01)

(52) U.S. Cl.
USPC .......................................... 366/130; 366/275

(58) Field of Classification Search
USPC ................................... 366/130, 275
See application file for complete search history.

(56) References Cited

U.S. PATENT DOCUMENTS

| | | | |
|---|---|---|---|
| 2,536,375 A | 1/1951 | Koehn | |
| 3,196,122 A | 7/1965 | Evans | |
| 4,735,509 A | 4/1988 | Rausch | |
| 5,398,483 A * | 3/1995 | Smith et al. | 53/474 |
| 5,951,160 A * | 9/1999 | Ronk | 366/130 |
| 6,364,163 B1 | 4/2002 | Mueller | |
| 6,752,293 B2 | 6/2004 | So | |
| 6,792,735 B2 | 9/2004 | Mohlenhoff | |
| 6,910,799 B2 | 6/2005 | Renfro | |
| 7,194,847 B2 | 3/2007 | Summons et al. | |
| 7,407,321 B1 | 8/2008 | Renfro | |
| 7,527,421 B2 | 5/2009 | Anderson et al. | |

* cited by examiner

*Primary Examiner* — David Sorkin
(74) *Attorney, Agent, or Firm* — McKee, Voorhees & Sease, P.L.C.

(57) ABSTRACT

A method and apparatus is provided for coloring a caulking material to match colored grout, or other construction materials. Colored grout is mixed with a caulking material, resulting in a caulk having a color and texture that closely matches the grout. The colored caulking material can be applied using an applicator bag, or using a conventional caulking gun.

12 Claims, 5 Drawing Sheets

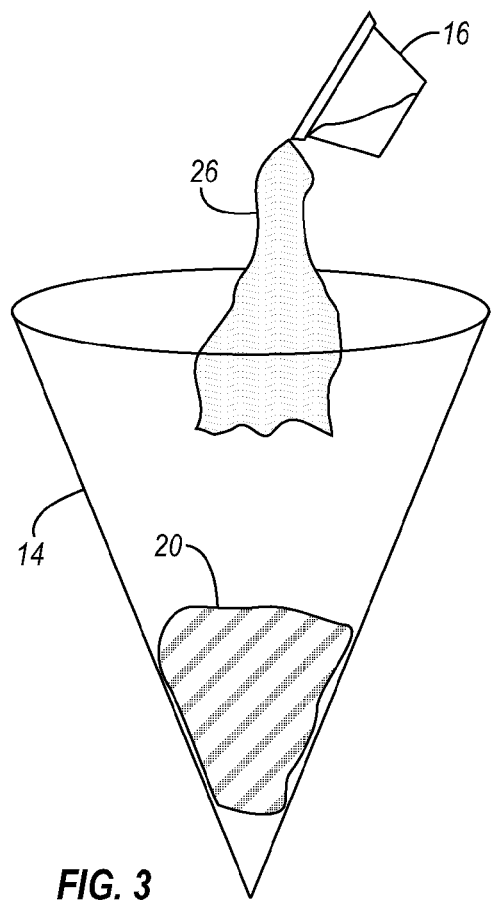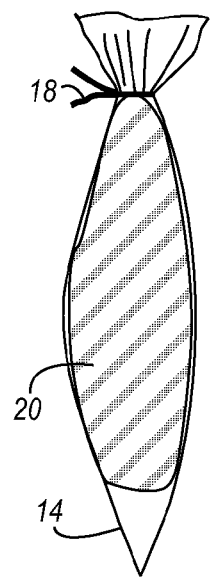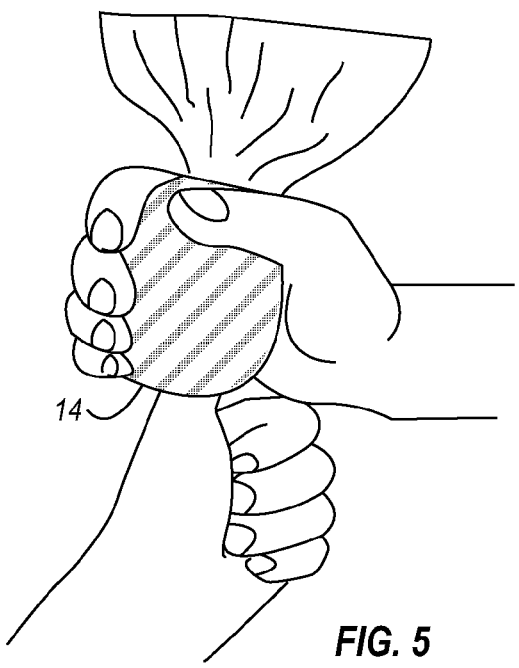
FIG. 3
FIG. 4
FIG. 5

CAULKING MATERIAL COLORING SYSTEM

CROSS REFERENCE TO RELATED APPLICATIONS

This application claims priority under 35 U.S.C. §119 to co-pending, commonly owned U.S. provisional patent application Ser. No. 61/233,731 filed on Aug. 13, 2009 entitled "ORIGINAL GROUTMATCH CAULKING SYSTEM", which is incorporated by reference herein.

FIELD

This invention relates to the application of flexible sealing compounds. In particular, this invention is drawn to a method and apparatus for making a caulking material that matches another construction material, such as grout.

BACKGROUND

After setting ceramic tiles, the gaps between the tiles are typically filled with grout. However, the seams between the tile and walls, showers, etc. are typically caulked, since grout in these places would likely crack. While colored caulks are available, none of the products available can be mixed on-site by the installer in a simple, affordable and desirable quantity. Many colors of caulk are not readily available without custom ordering. Also, many colored caulks are found to be of poor quality or not adequate for the installation and are not a consistent color match.

SUMMARY

An apparatus is provided for coloring caulking material to match installed grout including a caulking tube containing a predetermined quantity of caulking material, a mixing bag, a measuring device for measuring a predetermined amount of grout, wherein the quantity of caulking material, the tint of the caulking material, and the volume of the measuring device are selected such that the resulting mixture of measured grout and caulking material will have a color that closely matches the installed grout.

Another embodiment provides a method of caulking a tile joint, the method including placing caulking material in a mixing container, placing a colorant in the mixing container, mixing the caulking material and colorant, and using the mixture of caulking material and colorant to caulk the tile joint.

Another embodiment provides a method of coloring a caulking material to match installed grout, the method including providing a quantity of caulking material having a tint, mixing a quantity of grout with the caulking material, and wherein the quantity of caulking material, the tint of the caulking material, and the quantity of the grout are selected such that the resulting mixture of grout and caulking material will have a color that closely matches the installed grout.

Other features and advantages will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 3 illustrates the process of adding a measured amount of unmixed colored grout to the bag.

FIG. 4 illustrates the bag closed and secured.

FIG. 5 illustrates a mixing process, depicting a user manipulating the bag to mix the caulking material and the grout.

DETAILED DESCRIPTION

This disclosure relates to a method and system that uses a caulk-like product for onsite mixing to match the color of other construction materials, such as colored grout. For the purposes of this description, it is intended that the term "caulk" encompasses any type of material used to seal joints or seams, close gaps, fill voids, etc. Caulk may be comprised of any desired material, including, but not limited to silicone, latex, polyurethane, polymer, acrylic or other material, or combinations thereof. The method and system may be used for color matching a desired grout regardless of manufacturer brand and has the ability to be used with either aggregated on non aggregated grouts to be mixed on-site, resulting in a more uniform color.

This disclosure describes a system and method for coloring a caulking material to match colored grout, or other construction materials. In general, the disclosure teaches a technique where a colorant (e.g., colored grout) is mixed with a caulking material, resulting in a caulk having a color and texture that closely matches the grout. In order to provide a context for understanding the disclosure, the following description is described in the context of a method and system for coloring caulk to match the color of grout used in the installation of ceramic tiles. However, the system and method may also be used in other types of applications.

Using the techniques described below will provide a caulk having a color that will match the color of the grout better than a premixed colored product, since the techniques use the same grout and therefore is of the same lot number of the grout being used. This gives the user the ability to also adjust the color if desired by adding more or less of the colored grout to the caulk in order to reach a more desired color than what the user could purchase from a premixed colored product, should they decide they want a different shade of a particular color. The finished product is designed to be used where cementitious products might fail due to substrate movement, but where the end user still desires a product that matches the grout color. Generally, using the techniques described below, the base material is mixed with the grout, and this mixture is used as you would use ordinary caulking. Variations of this product could also be used as an expansion joint, control joint and other structural joint, or fillers where a desired color is desired.

Figure 1:
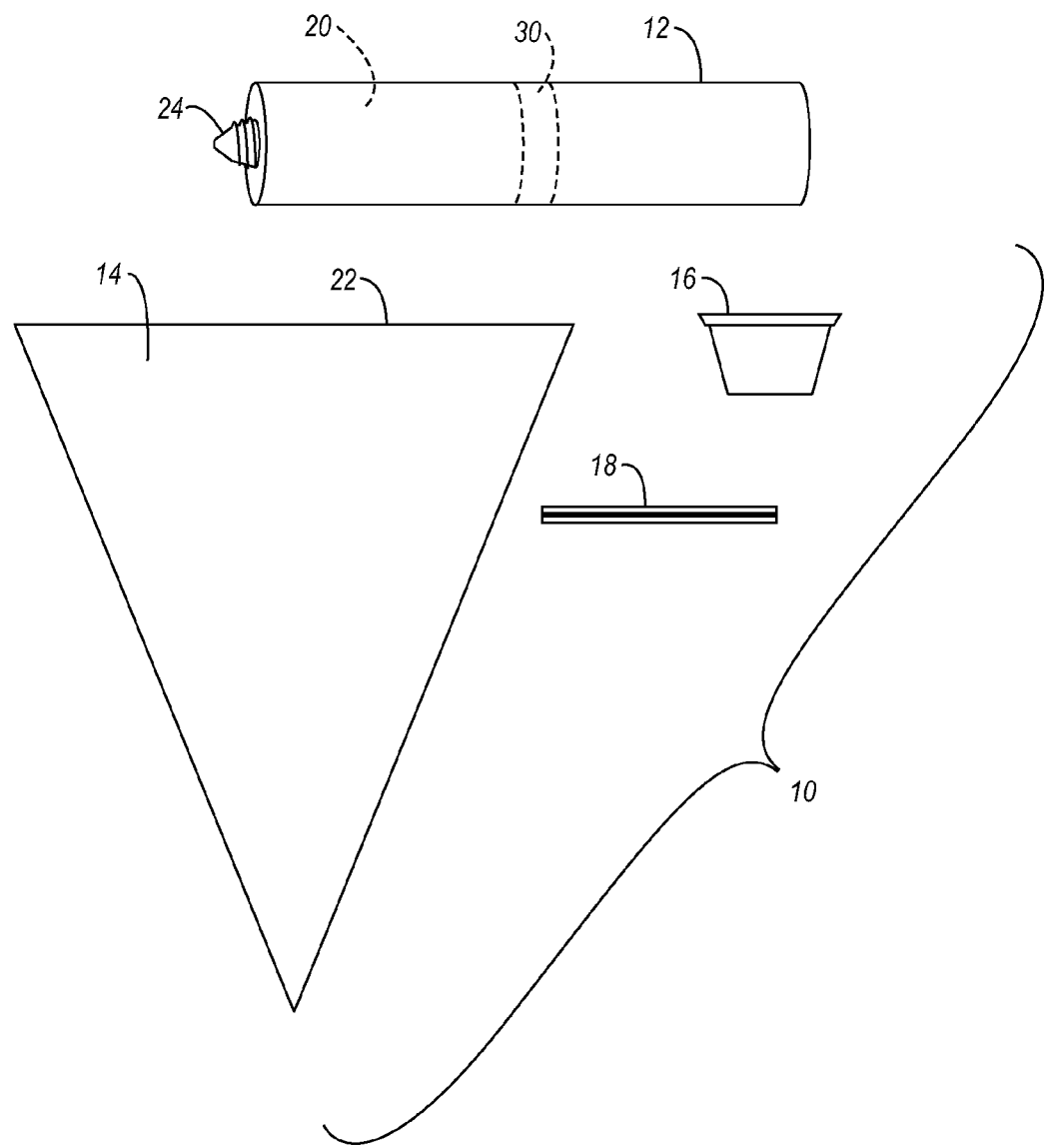
FIG. 1 is a diagram illustrating one example of components used to color caulk to match another building material.

FIG. 1 is a diagram illustrating one example of a kit, or components that may be used to color a caulking material to match another building material. In the example shown in FIG. 1, a kit 10 includes a caulking tube 12, a flexible mixing bag 14, a measuring device 16, and a closure device 18. Note that the items in FIG. 1 are not drawn to scale. In this example, the tube 12 contains a caulking material 20 to be used with cement grout to tint the caulking material 20 contained in the front portion of the caulk tube 12. In another example, the caulking material 20 can be packaged separately in a bag or other container. In yet another example, the caulking material 20 can be provided in two or more separate containers (each having a different color or tint) and mixed by a user, resulting in the desired tint. The caulking material can be packaged in tubes (e.g., FIG. 1), sausage-type packaging, jars, tubs, buckets, or any other desired type of package designed to keep product in its original state prior to use. The package or container can be of plastic, paper, rubber, metal or any suitable type material and can be packaged as a single unit, multiple units, or with each component (e.g., white and clear components) separately.

In one example, the caulking material 20 is comprised of a predetermined amount by volume or weight of a base tint caulking material. The caulking material may be comprised of, for example, silicone, acrylic/latex, siliconized acrylic/latex, polyurethane, or other type(s) of caulking material. In either a premixed or separate form, the caulking material tint base results in a clearish white, semi opaque mixture. In one example, the mixture that results (using a color spectrum scale of 0=clear and a shade of white=100) the color would fall between the ranges of 40 to 80. Other examples are also possible. This range of clear to white will vary due to the manufacturer or manufacturing process, the ingredients used, the raw materials used, etc. If the caulking tint is too clear, or too white, it will be difficult to match the grout color. Caulk with too little tint may, after being mixed with the grout, may have a color that is close to the grout, but will look too clear. Caulk with too much tint (i.e., too white) may, after being mixed with the grout, may have a color that is similar to the grout, but may look creamy or milky. In addition to using caulking material with a desired tint, the color of the installed grout can be best matched by using a predetermined quantity of caulking material and a predetermined volume of colored grout. In the examples above, the quantity of caulking material packaged in the caulking tube 12 and the volume of the grout (as determined by using the measuring device) are selected such that the resulting mixture will closely match the color of the installed grout.

In the example shown in FIG. 1, the caulking material 20 is packaged in the caulking tube 12. As shown by the position of the plunger 30, the caulking material 20 only fills about half of the tube 12. The other portion of the tube 12 can hold the other components of the kit 10, such as the bag 14, measuring device 16, and closure device 18. Similarly, if other types of packaging are used, such as another type of tube, box, clam shell, blister pack, jar or other container, that container may also store the contents of the kit.

FIG. 1 also shows one example of a mixing bag/container. In the example shown, a mixing bag 14 is be constructed of low density polyethylene (LDPE) or other clear or semi-clear material which allows a user to see when the when the mixture (described below) is a uniform color. In one example, the bag 14 is made from a soft/pliable plastic material, having a thickness suitable to hold up under the pressure of manipulation, kneading, or another method of mixing of the caulking material and aggregated or non aggregated grout. The bag 14 can have a triangular shape or other similar or usable shape with one open end 22 and having an appropriate size for the weight/volume of caulking material, while allowing a user enough room to secure the open end 22 and manipulate the bag 14 to mix the contents. The mixing vessel can be something other than a bag, and of any shape or configuration such as a cup, bucket or other type of container and can be made from any type of material that is suitable for mixing.

FIG. 1 illustrates one example of a measuring device 16. In this example the measuring device 16 is comprised of a measuring cup, but could also be comprised of a scoop, spoon, tube or any other configuration made from any desired material. The measuring device 16 is used to determine a measured amount of a grout product. This amount will be dependent on the weight/volume of the caulking material that, when mixed with the grout, will result in a caulk mixture that matches the color of the grout.

FIG. 1 illustrates one example of a closure device 18. The closure device 18 shown in FIG. 1 is a twist tie, but could also be a zip tie, a wire, a rubber band, tape, zipper closure, string, clip, or other closure device suitable to close the end of the bag 14 for mixing using a kneading type motion, as described below.

Figure 2:
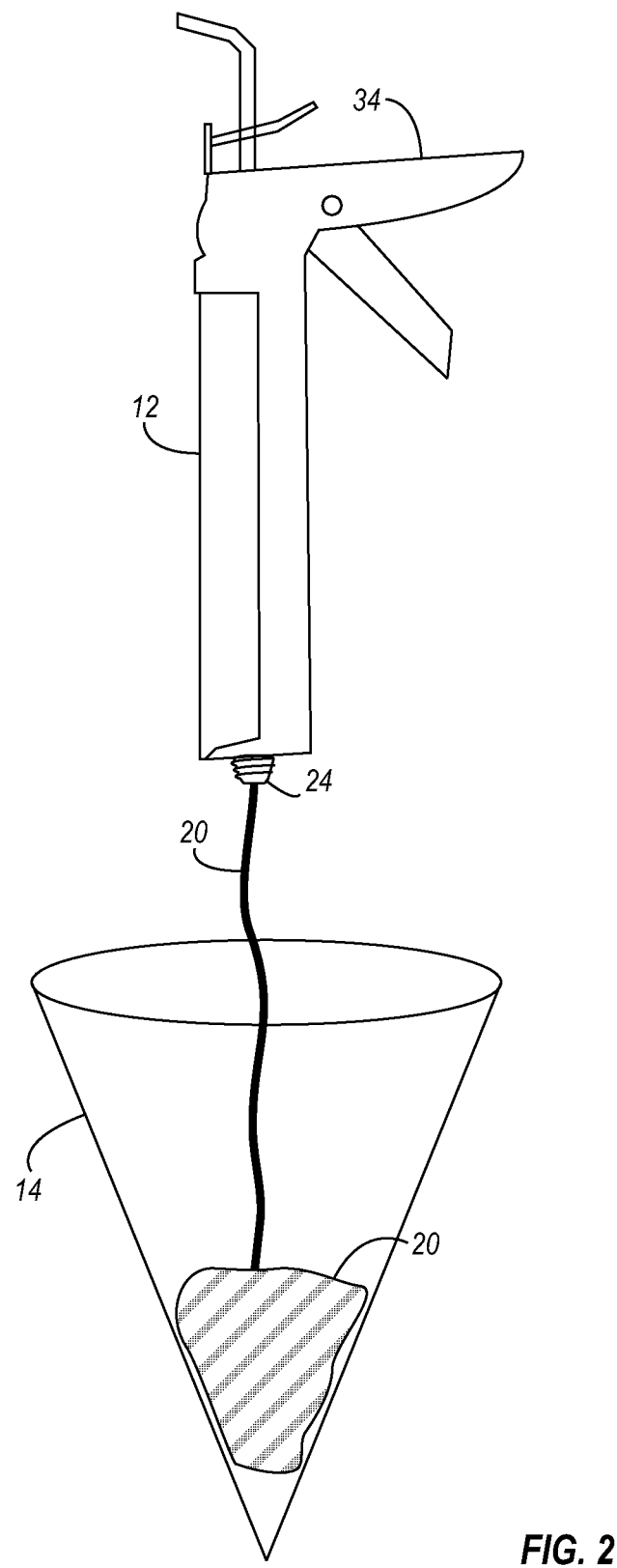
FIG. 2 illustrates the process of removing caulking material from the container.

In one example of the method, the caulking material 20 is placed in the bag 14, so it can be mixed with the grout. FIG. 2 illustrates the process of removing the caulking material 20 from the tube 12. In this example, a user uses a knife to cut off the tip/nub 24 of the caulk tube 12 and then uses a caulking gun 34 to squirt the caulking material 20 into the bag 14. In the example where a kit contains two caulking materials (e.g., white and clear), the user will place both caulking materials in the bag 14, so they can be mixed.

FIG. 3 illustrates the process of adding the measured amount of colored grout 26 to the bag 14 using the measuring device 16 to determine the amount of grout to add. To create the best color match, the grout 26 added to the bag 14 is same grout that was used when installing the tiles (i.e., from the original box or bag).

After the caulking material 20 and grout 26 are both added to the bag 14, the user closes the bag using the closure device 18. FIG. 4 shows the bag 14 closed and secured using the closure device 18. Alternatively, a user could simply hold the bag closed while mixing.

After the bag 14 is closed, the contents of the bag 14 are mixed. FIG. 5 illustrates a mixing process, depicting a user manipulating the bag to mix the caulking material 20 and the grout 26. In the example shown, one finger is being pushed up into the bag and used to mix the caulking material and the grout by using the finger as a mixing device, while the user and kneads, squeezes and otherwise manipulates the bag until a uniform color is achieved.

Figure 6:
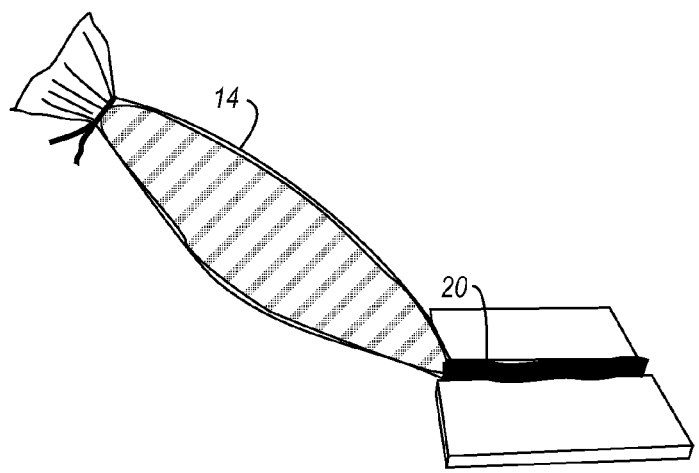
FIG. 6 illustrates the colored caulking material being applied directly from a bag.

Once the caulking material 20 and grout 26 are mixed, the mixture is ready for use. In one example, a user can simply cut off the corner or tip of the bag 14 and apply the colored caulking material by squeezing the material out of the bag 14. The tip of the bag is cut to the desired size for the joint to be caulked. FIG. 6 illustrates the colored caulking material being applied directly from the bag 14. As shown, caulking material 20 is being applied to the seam between two structures (e.g., a tile and a wall, etc.). In another example (described below), the mixture is dispensed using a standard caulking gun.

Figure 7:
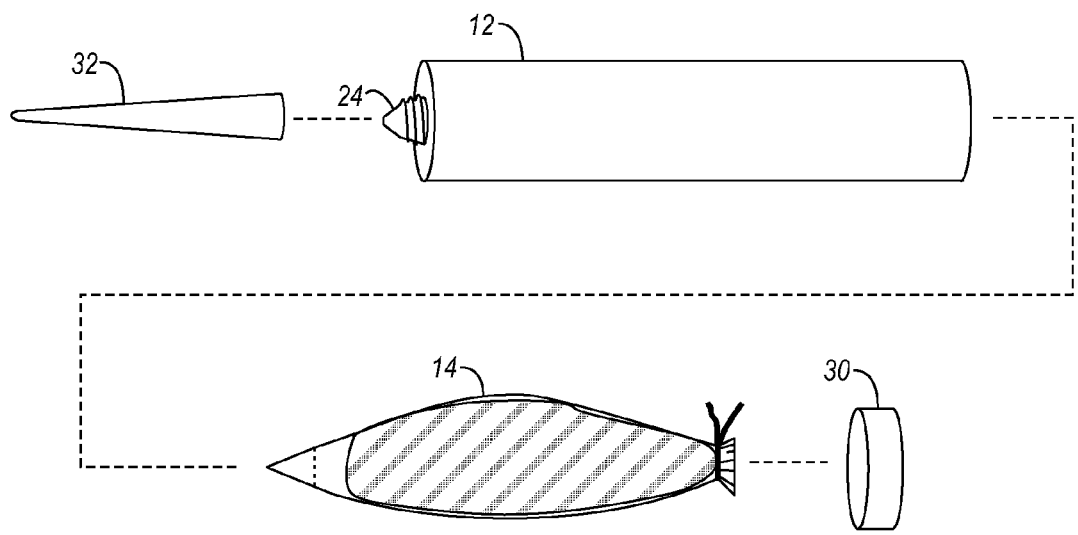
FIG. 7 is an exploded view of an empty caulking tube, a nozzle, a bag filled with colored caulking material, and a plunger.

Generally, to apply the colored caulking mixture using a caulking gun, the tip of the bag 14 is cut, and the bag is placed into an empty caulking tube with a plunger. In one example, a user forms the bag 14 containing the colored caulking material 20, into a generally long thin shape (as shown in FIG. 7) to that can slide into the empty caulking tube 12. Prior to inserting the bag 14 into the caulking tube 12, the end of the bag 14 is cut about one inch back from the tip of the bag 14 (as illustrated by the dashed line in FIG. 7). Also, the excess of the open end of the bag 14, still secured with the closure device 18, is cut relatively close to the closure device 18.

Figure 8:
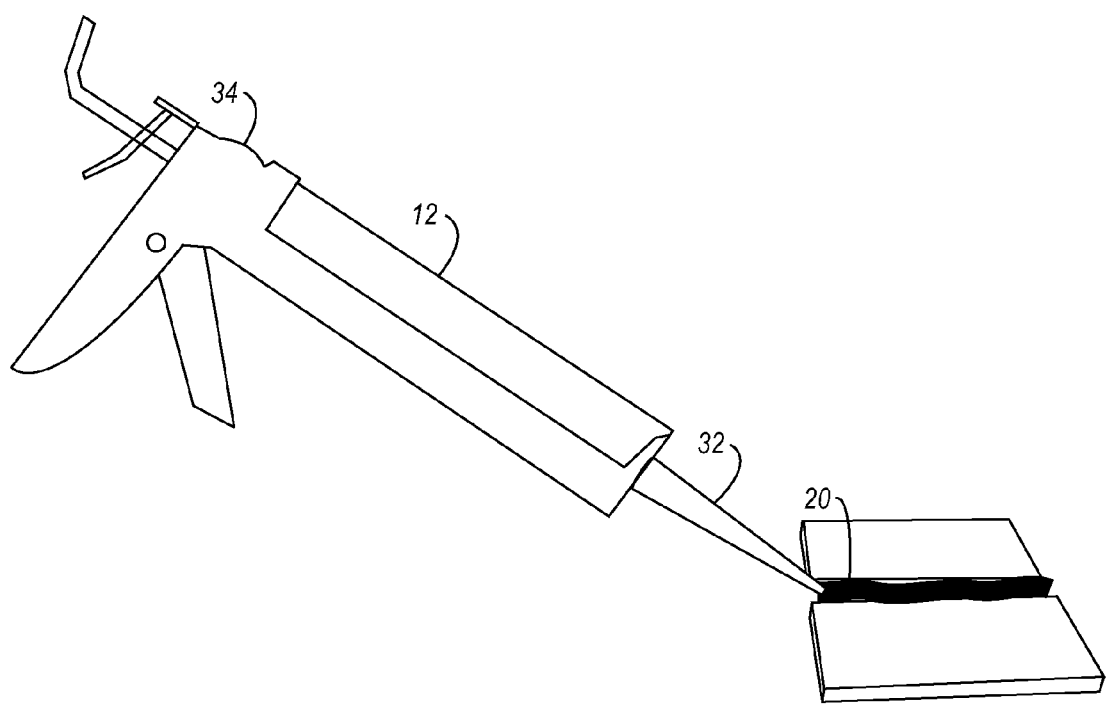
FIG. 8 illustrates the colored caulking material being applied using a caulking gun.

FIG. 7 is an exploded view of an empty caulking tube 12, a screw-on nozzle 32, a bag 14, and a plunger 30. If using the same caulking tube 12 that held the unmixed caulking material (see FIG. 2), the tip/nub 24 will already be cut. If using a new tube 12, the tip/nub is cut, to allow air to escape while the bag 14 is inserted into the tube 12. After the bag 14 is inserted into the tube 12, the nozzle 32 is screwed on, and the plunger 30 is pushed into the open end of the tube. The tip of the nozzle 32 is cut to provide a desired sized opening. The caulking tube 12 can then be placed in a regular caulk gun and the caulk can be applied in a conventional manner. If part of the bag 14 blocks the caulking material from flowing through the opening of the tube 12, a hole can be punctured in the bag by inserting a screwdriver, or similar item, through the tip of the tube 12. FIG. 8 illustrates caulk being applied using the tube 12 and a caulking gun 34. As shown, caulking material 20 is being applied to the seam between two structures (e.g., a tile and a wall, etc.).

Note that the process described above for filling an empty caulking tube and applying the material using a caulking gun can apply to any desired application, including the application of construction materials, adhesives, etc.

Figure 9:
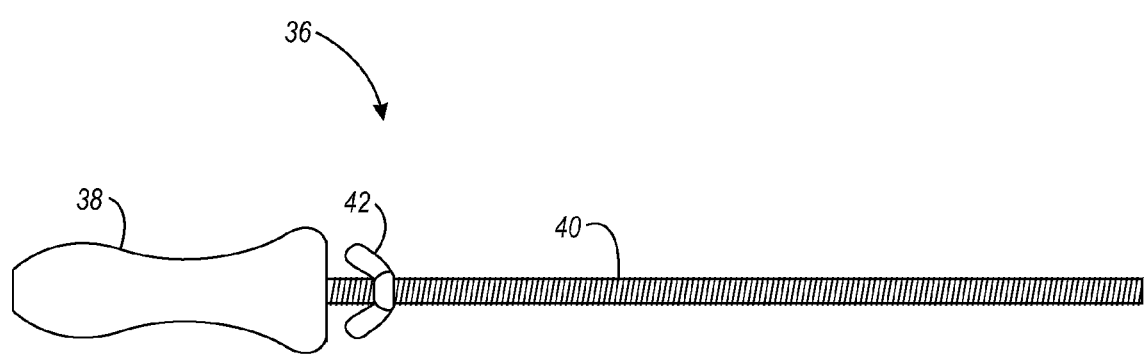
FIG. 9 illustrates a tool used to remove the plunger from a caulking tube.

A caulking tube 12 may be reused, if desired. For example, the tube 12 containing the uncolored caulking material (FIG. 1) can be reused to apply the colored caulking material (FIGS. 7-8). To reuse a tube 12, the plunger 30 is removed. FIG. 9 is a diagram of a tool 36 having handle 38 and an elongated shaft 40. The shaft 40 is sized to be able to fit through the tip 24 of the caulking tube 12. A user can push the shaft 40 through the tip 24 of the tube 12 to push the plunger 30 back out of the tube. After use, the shaft 40 of the tool 36 may be covered with the caulking material. The shaft 40 is threaded, and can be easily cleaned using the nut 42. After the caulk has dried, a user turns the nut, which cleans the shaft 40 by pushing the nut 42 through the dried caulk. The nut shown is a wing nut, but a hex nut, or other type of nut could also be used. Also, to speed up the process, a user may couple a drill, or other motorized device, to the shaft 40 while holding the nut 42 to quickly move the nut 42 across the shaft 40.

In the preceding detailed description, the disclosure is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A kit used for coloring caulking material to match installed grout comprising:
   a mixing bag;
   a measuring device having a predetermined volume for measuring a predetermined amount of grout;
   a predetermined quantity of caulking material having a tint;
   a container containing the predetermined quantity of caulking material; and
   wherein the predetermined quantity of caulking material, the tint of the caulking material, and the predetermined volume of the measuring device are selected such that a resulting mixture of measured grout and predetermined quantity of caulking material will have a color that closely matches the installed grout.

2. The kit of claim 1, wherein the predetermined quantity of caulking material is comprised of silicone caulk.

3. The kit of claim 1, further comprising a closure device to secure the mixing bag after the caulking material and grout is added.

4. The kit of claim 1, wherein the container is comprised of a caulking tube.

5. The kit of claim 4, wherein the mixing bag is configured to fit within the caulking tube when the mixing bag is filled with the predetermined quantity of caulking material and the predetermined amount of grout, allowing the colored caulking material to be applied using a caulking gun.

6. The kit of claim 5, further comprising a tool for removing a plunger from the caulking tube, wherein the tool includes an elongated shaft configured to fit through the application end of the caulking tube.

7. The kit of claim 6, wherein the elongated shaft is threaded, and wherein the tool further comprises a nut for cleaning caulk off of the elongated shaft.

8. A kit used for coloring and applying caulking material that matches installed grout, the kit comprising:
   a flexible mixing bag;
   a measuring device having a predetermined volume for measuring a predetermined amount of grout;
   a predetermined quantity of caulking material having a tint;
   a caulking tube having an application end, an open end, and a plunger;
   wherein the predetermined quantity of caulking material, the tint of the caulking material, and the predetermined volume of the measuring device are selected such that a resulting mixture of measured grout and predetermined quantity of caulking material will have a color that closely matches the installed grout; and
   wherein the flexible mixing bag is sized such that, when filled with the mixture of measured grout and predetermined quantity of caulking material, the flexible mixing bag fits within the caulking tube, allowing the mixture to be applied using a caulking gun.

9. The kit of claim 8, further comprising a tool for removing the plunger from the caulking tube, wherein the tool includes an elongated shaft configured to fit through the application end of the caulking tube.

10. The kit of claim 9, wherein the elongated shaft is threaded, and wherein the tool further comprises a nut for cleaning caulking material off of the elongated shaft.

11. The kit of claim 8, wherein the predetermined quantity of caulking material is comprised of silicone caulk.

12. The kit of claim 8, further comprising a closure device to secure the flexible mixing bag after the caulking material and grout is added to the flexible mixing bag.

* * * * *